US009933685B2

(12) United States Patent
Srivastava et al.

(10) Patent No.: US 9,933,685 B2
(45) Date of Patent: Apr. 3, 2018

(54) SWITCHABLE LIQUID CRYSTAL FRESNEL LENS

(71) Applicant: The Hong Kong University of Science and Technology, Hong Kong (CN)

(72) Inventors: Abhishek Kumar Srivastava, Lucknow (IN); Xiaoqian Wang, Shanghai (CN); Vladimir Grigorievich Chigrinov, Hong Kong (CN); Hoi-Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 58 days.

(21) Appl. No.: 14/452,190

(22) Filed: Aug. 5, 2014

(65) Prior Publication Data
US 2015/0036084 A1   Feb. 5, 2015

Related U.S. Application Data

(60) Provisional application No. 61/958,742, filed on Aug. 5, 2013.

(51) Int. Cl.
*G02F 1/141* (2006.01)
*G02F 1/29* (2006.01)
(Continued)

(52) U.S. Cl.
CPC .............. *G02F 1/29* (2013.01); *G02F 1/1337* (2013.01); *G02F 1/133753* (2013.01);
(Continued)

(58) Field of Classification Search
CPC ...... G02F 1/29; G02F 1/33528; G02F 1/1337; G02F 2001/294; G02F 1/141
See application file for complete search history.

(56) References Cited

U.S. PATENT DOCUMENTS 4,904,063 A   2/1990   Okada et al.
5,069,813 A   12/1991   Patel
(Continued)

FOREIGN PATENT DOCUMENTS

EP   0525424 B1   10/1998
FR   2956489 A1   8/2011
(Continued)

OTHER PUBLICATIONS

Fan et al., "Switchable Fresnel lens using polymer-stabilized liquid crystals," *Optics Express*, 11(23), 2003.
(Continued)

*Primary Examiner* — Dung Nguyen
(74) *Attorney, Agent, or Firm* — Leydig, Voit & Mayer, Ltd.

(57) ABSTRACT

A liquid crystal Fresnel lens is provided. The liquid crystal Fresnel lens includes a liquid crystal cell and two polarizers. The liquid crystal cell includes: two transparent substrates having conducting layers disposed thereon with alignment layers, wherein an alignment pattern formed by the alignment layers are configured to provide multiple alignment domains in a Fresnel zones pattern, and wherein an easy axis of adjacent alignment domains are oriented at an angle relative to one another; and a ferroelectric liquid crystal layer disposed between the two transparent substrates, wherein the ferroelectric liquid crystal layer has a planar surface orientation and smectic layers perpendicular to the two transparent substrates. The liquid crystal cell is disposed between the two polarizers.

8 Claims, 15 Drawing Sheets

(51) Int. Cl.
  *G02F 1/1337* (2006.01)
  *G02F 1/1335* (2006.01)
(52) U.S. Cl.
  CPC ........ *G02F 1/133788* (2013.01); *G02F 1/141* (2013.01); *G02F 1/133528* (2013.01); *G02F 2001/1414* (2013.01); *G02F 2001/294* (2013.01)

(56) References Cited

U.S. PATENT DOCUMENTS

| | | | |
|---|---|---|---|
| 5,178,636 | A | 1/1993 | Silberman |
| 5,453,218 | A * | 9/1995 | Wand ...................... C07C 69/92 252/299.01 |
| 5,596,434 | A * | 1/1997 | Walba ...................... B82Y 30/00 349/123 |
| 5,617,229 | A * | 4/1997 | Yamamoto ........ G02F 1/133621 349/106 |
| 6,046,789 | A * | 4/2000 | Funfschilling .......... G02F 1/141 349/172 |
| 6,975,786 | B1 | 12/2005 | Warr et al. |
| 7,408,601 | B1 | 8/2008 | Huang et al. |
| 8,243,251 | B2 | 8/2012 | Yokoyama |
| 8,248,712 | B2 | 8/2012 | Yu et al. |
| 8,411,193 | B2 | 4/2013 | Chiu |
| 8,471,999 | B2 * | 6/2013 | Valyukh et al. ............. 349/200 |
| 8,964,156 | B2 * | 2/2015 | Kimura ......................... 349/141 |
| 2011/0285928 | A1 * | 11/2011 | Chigrinov ............. G02F 1/1416 349/33 |
| 2012/0045619 | A1 * | 2/2012 | Ando ............... B29D 11/00269 428/161 |
| 2013/0050639 | A1 * | 2/2013 | Trajkovska ............... A61F 2/16 351/159.39 |
| 2013/0169909 | A1 * | 7/2013 | Srivastava ........ G02F 1/133753 349/96 |
| 2016/0187691 | A1 * | 6/2016 | Srivastava ............ G02F 1/1396 349/33 |

FOREIGN PATENT DOCUMENTS

| | | |
|---|---|---|
| WO | WO 1995027932 | 10/1995 |
| WO | WO 1998018039 | 4/1998 |

OTHER PUBLICATIONS

Jeng et al., "Electrically switchable liquid crystal Fresnel lens using UV-modified alignment film," *Optics Express*, 18(25), 2010.

Lin et al., "Highly efficient and polarization-independent Fresnel lens based on dye-doped liquid crystal," *Optics Express*, 15(6), 2007.

Lo et al., "Electrically controllable and polarization-independent Fresnel zone plate in a circularly symmetric hybrid-aligned liquid crystal film with a photoconductive polymer layer," *Applied Physics Letters*, 91, 181104, 2007.

Ren et al., "Tunable Fresnel lens using nanoscale polymer-dispersed liquid crystals," *Applied Physics Letters*, 83(8), Aug. 25, 2003.

* cited by examiner

SWITCHABLE LIQUID CRYSTAL FRESNEL LENS

CROSS-REFERENCE TO RELATED APPLICATIONS

This patent application claims the benefit of U.S. Provisional Patent Application No. 61/958,742, filed Aug. 5, 2013, which is incorporated by reference.

FIELD

Embodiments of the invention relate to a liquid crystal (LC) structure which acts as a diffractive lens. In one embodiment, the LC structure is switchable between FOCUS and OFF states, which provides a focusing effect with high efficiency in the FOCUS state and is dark when switched to the OFF state. In another embodiment, the LC structure is switchable between FOCUS and DEFOCUS states, which provides a focusing effect in the FOCUS state and provides partial transmission in the DEFOCUS state.

BACKGROUND

LC Fresnel lenses have a variety of applications, for example, in optical information processing, long-distance optical communications, optical interconnections, beam shaping devices, 3D display systems, etc. Conventional LC Fresnel lenses are typically made of nematic LCs, and have switching times greater than several milliseconds (and in some cases, even greater than 100 milliseconds).

One class of LC Fresnel lenses involves phase separation of a mixture of a liquid crystal and another material, typically polymer or dye, which exploits the refractive index difference between the background matrix and the additive.

Another class of LC Fresnel lenses employs patterned electrodes to generate a periodic electric field distribution to control the LC directors locally.

Yet another class of LC Fresnel lenses utilizes initially-guided LC directors to realize a periodic refractive index distribution (e.g., via a patterned polymer relief and UV-modified alignment films). This approach includes two different alignment domains to provide an alignment structure using Fresnel zones. These two different alignment domains may be a combination of planar and homeotropic alignment domains, a combination of planar and twist alignment domains, a combination of two planar alignment domains, etc.

These existing LC Fresnel lens architectures are characterized by low efficiency, complicated fabrication procedures, high driving voltage requirements (e.g., greater than 100 volts), and long switching times (e.g., on the order of hundreds of milliseconds). Such long switching times are unsuitable for many modern applications, which demand lenses having a very short response times (e.g., less than 1 millisecond).

SUMMARY

Embodiments of the invention provide LC Fresnel lenses utilizing ferroelectric liquid crystals aligned in two planar alignment domains. These embodiments achieve fast response times (e.g., less than 100 µs), low driving voltage requirements (e.g., less than 10V), and high efficiency.

In an exemplary embodiment, the invention provides a liquid crystal Fresnel lens, including: a liquid crystal cell and two polarizers. The liquid crystal cell includes: two transparent substrates having conducting layers disposed thereon with alignment layers, wherein an alignment pattern formed by the alignment layers are configured to provide multiple alignment domains in a Fresnel zones pattern, and wherein an easy axis of adjacent alignment domains are oriented at an angle relative to one another; and a ferroelectric liquid crystal layer disposed between the two transparent substrates, wherein the ferroelectric liquid crystal layer has a planar surface orientation and smectic layers perpendicular to the two transparent substrates. The liquid crystal cell is disposed between the two polarizers.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide an LC Fresnel lens which includes an LC cell having two transparent substrates with current conducting layers treated by photoalignment. The photoalignment is used to realize multiple alignment domains on the current conducting layers. The easy axes (i.e., the axes that define the alignment direction) of different alignment domains are set at an angle relative to one another, and the alignment pattern provided by the photoalignment is set in a pattern that satisfies the conditions for Fresnel zones. Namely, the zone boundaries of each Fresnel zone formed by the alignment pattern are given by the equation $$r_n = \sqrt{n\lambda f + \frac{n^2\lambda^2}{4}},$$

where $r_n$ is the radius of a domain, n is an integer, $\lambda$ is the wavelength of the light the Fresnel lens is intended to focus, and f is the focal length (i.e., the distance from the center of the LC cell to the focus). Between the two substrates, a ferroelectric liquid crystal (FLC) layer is provided. The FLC layer has smectic layers perpendicular to the substrates, and the liquid crystals of the FLC layer are adapted to be aligned based on the alignment domains of the pattern provided by the conducting layers of the substrates. Two polarizers are further attached on the outside of the LC cell, so as to, together with the LC cell, form a complete LC Fresnel lens.

In an embodiment, a fabricated LC Fresnel lens having the foregoing features has two states: a FOCUS state, which is a diffractive state with a diffraction pattern; and a DEFOCUS state, which is a transmission state allowing light to pass through without any diffraction pattern. The fabricated LC Fresnel lens may be switched between the FOCUS and DEFOCUS states by applying the AC electric field. In particular, the fabricated LC Fresnel lens is switchable between the saturated FOCUS and DEFOCUS states by using an electric field frequency of, for example, 10 kHz or even higher, depending on the magnitude of the applied electric field.

The use of ferroelectric liquid crystals (FLCs) in LC-based architectures provide for high switching speeds at low driving voltages, but using FLCs is conventionally known to be challenging due to geometrical defects of FLCs, which deteriorate contrast and make alignment difficult. Embodiments of the invention overcome these challenges by utilizing photoalignment technology to achieve precise alignment domains with precision, and are thus able to provide an FLC-based architecture for LC Fresnel lenses having fast response times, high efficiency, low driving voltage requirements, and low manufacturing costs.

Figure 1:
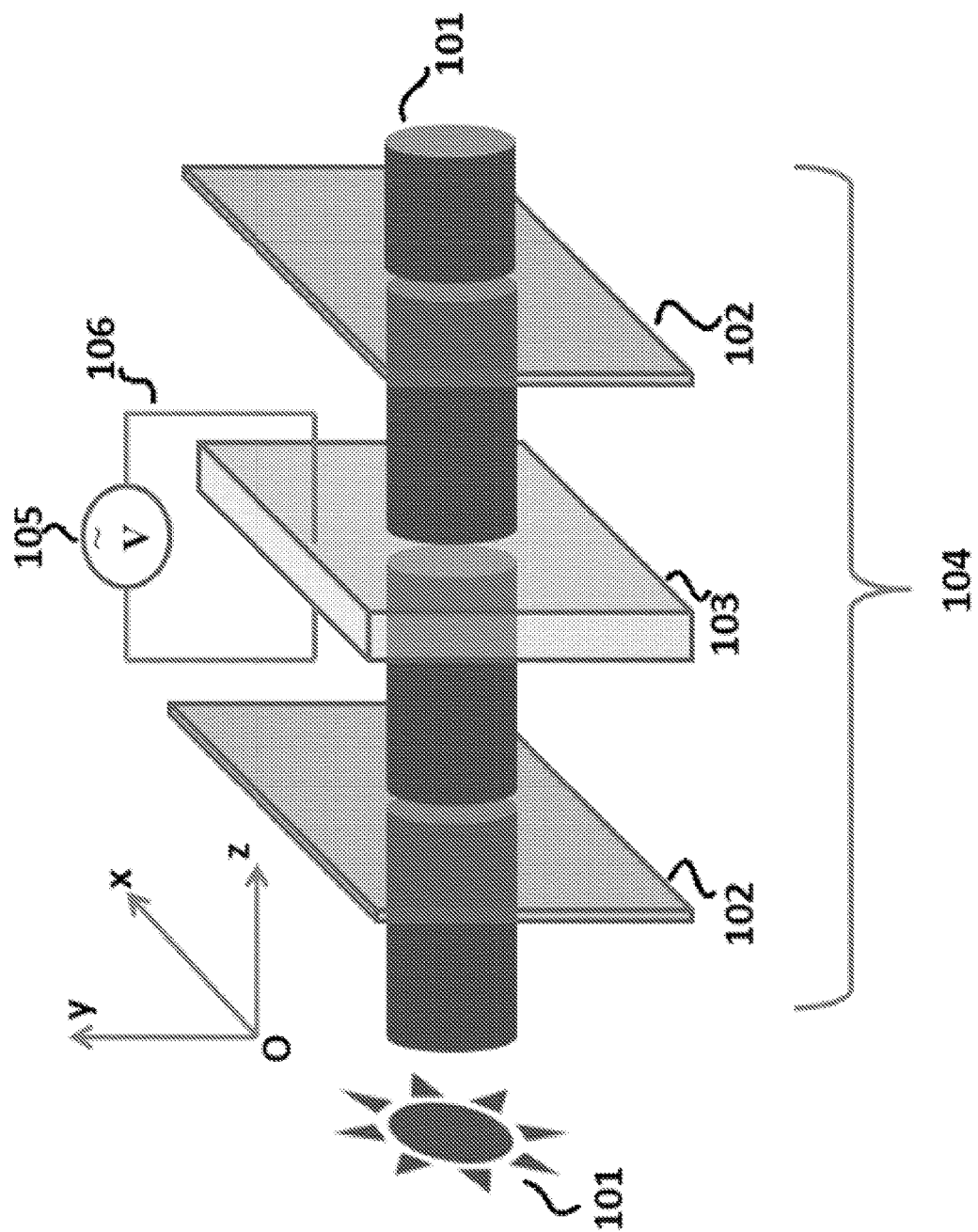
FIG. 1 illustrates an expanded view of an LC Fresnel lens according to embodiments of the invention.

FIG. 1 depicts an expanded view of an LC Fresnel lens 104 that is illustrative of the LC Fresnel lens components included in embodiments of the invention. The LC Fresnel lens 104 includes an FLC cell 103, which acts as a Fresnel phase plate (or "zone plate"), and which includes two transparent substrates with current-conducting layers treated by photoalignment. An AC voltage source 105 is applied to the conducting layers of the FLC cell 103 via wires 106 so that the FLC cell 103 is switchable between different states. The conducting layers of the FLC cell 103 are treated by photoalignment, and the configuration of the alignment domains of the conducting layers varies in different embodiments (as will be discussed in further detail below). The liquid crystal layer of the FLC cell 103 has smectic layers that are perpendicular to the transparent substrates of the FLC cell 103.

The LC Fresnel lens 104 further includes two polarizers 102. The two polarizers 102 have polarization directions at different angles in the x-y plane (according to the x-y-z reference system depicted in FIG. 1). FIG. 1 further illustrates a light beam 101 passing through the LC Fresnel lens 104.

The liquid crystals of the FLC cell 103 are provided in an electrically suppressed helix (ESH) electro-optical mode, where the FLC helix pitch is less than the thickness of the liquid crystal layer, and the FLCs have an optimal anchoring energy for the alignment layer. The liquid crystal layer of the FLC cell 103 includes chiral smectic liquid crystals. An AC rectangular voltage provided by the AC voltage source 105 is applied to the electrodes of the cell, with amplitude higher than the critical voltage amplitude of the helix unwinding (i.e., applied voltage V>critical voltage $V_c$), to switch the FLC cell 103 (and the LC Fresnel lens 104) between different states.

Figure 2:
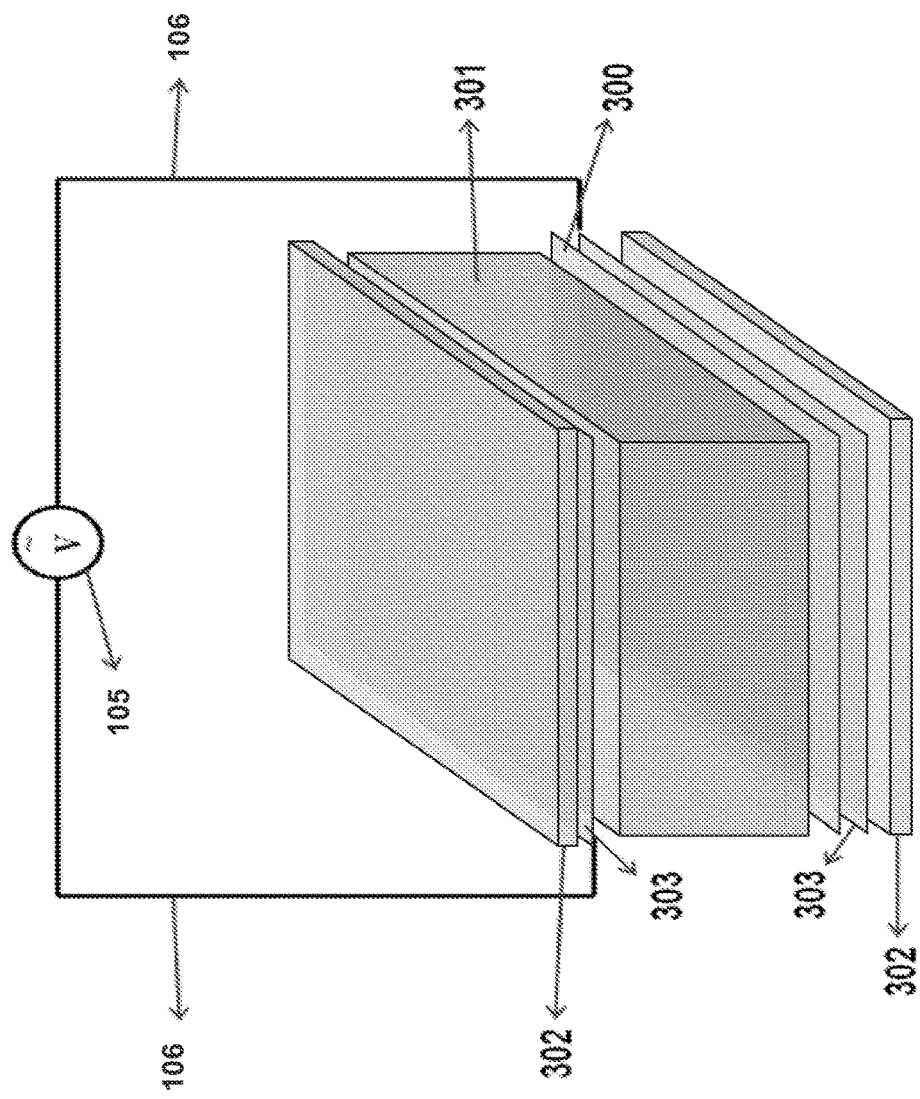
FIG. 2 illustrates an expanded view of an FLC cell of an LC Fresnel lens according to embodiments of the invention.

FIG. 2 depicts an expanded view of the FLC cell 103, which acts as a "Fresnel phase plate" or a "zone plate." The FLC cell 103 includes substrates 302, conductive layers 303, and a liquid crystal layer 301 having smectic layers. The conducting layers 303 of the FLC cell 103 are connected to an AC voltage source 105 by wires 106. The substrates 302 are transparent so as to allow light to pass through. The conductive layers 303, which for example could be ITO, are also transparent and at least one of the conductive layers 303 is covered with an alignment layer 300 (in the embodiment depicted in FIG. 2, only one alignment layer 300 is used, but other embodiments include both conductive layers 303 being covered with alignment layers). The smectic layers of the liquid crystal layer 301 are perpendicular to the plane of the substrates such that the helix axes of the ferroelectric liquid crystals are parallel to the plane of substrates. The cell gap d of the FLC cell 103 is set to provide a half wave plate (i.e. $\lambda/2$ plate meeting the half wave plate condition $d\Delta n=\lambda/2$), where $\lambda$ is the wavelength of the incident light, so as to achieve an optimal diffraction efficiency (for a focusing effect).

Figure 3A:
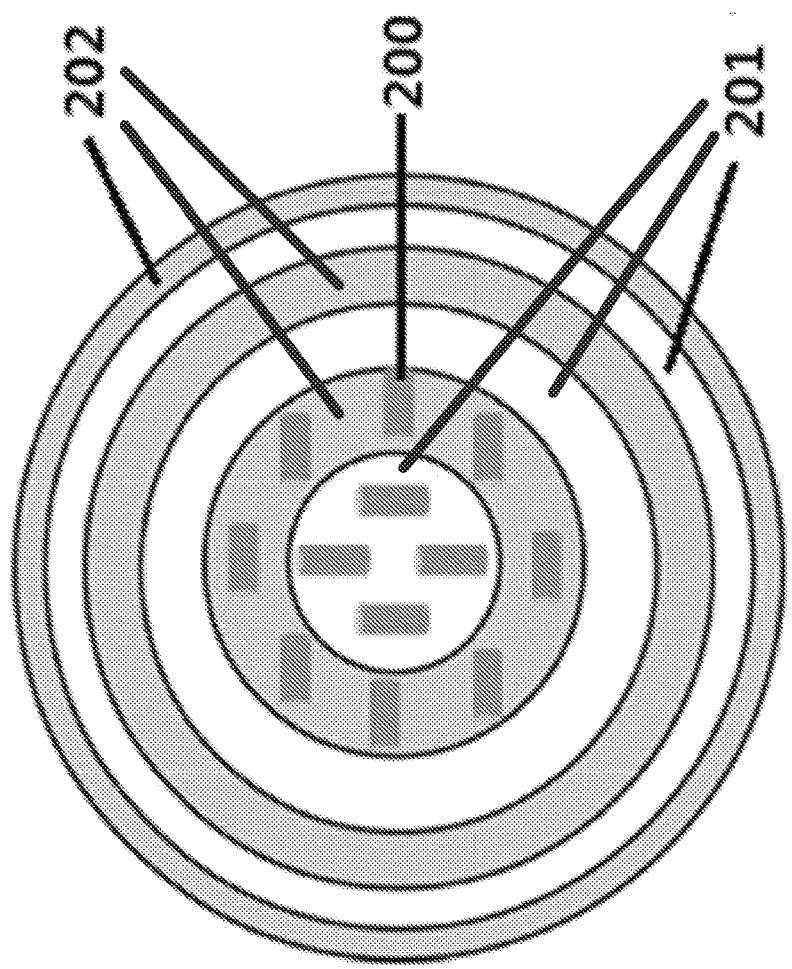
FIGS. 3A and 3B illustrates liquid crystal orientations and Fresnel zone configurations according to embodiments of the invention.

In a first exemplary embodiment, an LC Fresnel lens (having the components shown in FIGS. 1 and 2 above) is switchable between FOCUS and OFF states. FIG. 3A depicts the orientations of the liquid crystals of the FLC cell of the LC Fresnel lens in this first exemplary embodiment. Liquid crystals in odd zones 201 (depicted as white) have a first alignment direction while liquid crystals in even zones 202 (depicted as gray) have a second alignment direction. Specifically, in FIG. 3A, the liquid crystals in odd zones 201 are oriented orthogonally relative to the liquid crystals in even zones 202 (i.e., offset by 90 degrees), while all liquid crystals are parallel to the surface of the FLC cell. The alignment directions are shown by the dark gray rods 200. The liquid crystals in each of the odd zones 201 have the same alignment and the liquid crystals in each of the even zones 202 have the same alignment.

In this first exemplary embodiment, the LC Fresnel lens provides a diffraction efficiency of over 37% in the FOCUS state, and exhibits perfect electro-optical modulation. The saturated FOCUS and OFF (dark) states in a given time frame are derived from an applied frequency up to very high frequencies (e.g., up to 5 kHz) and at low driving voltage magnitude (e.g., less than 6.5 volts/μm). The saturated state is a state in which the transmittance does not change with time in the given frame of time. The applied frequency is selected to optimize the saturated electro-optical response.

Figure 3B:
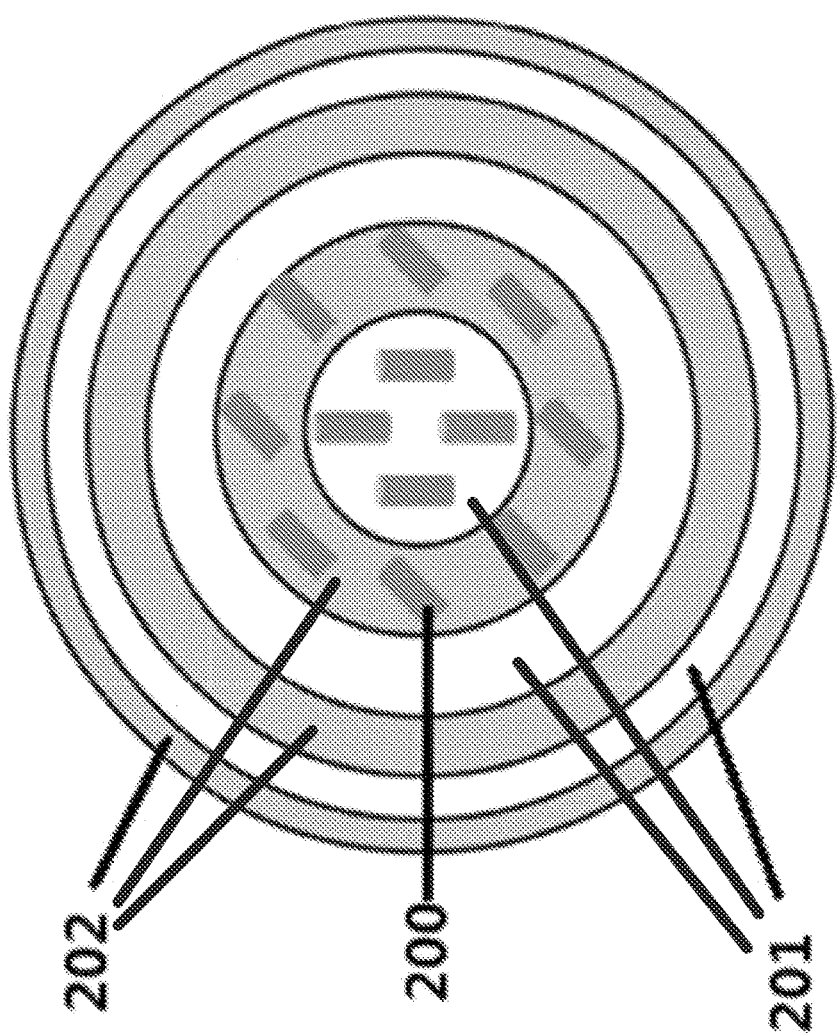

In a second exemplary embodiment, an LC Fresnel lens is switchable between FOCUS and DEFOCUS states. FIG. 3B depicts the orientations of the liquid crystals of the FLC cell of the LC Fresnel lens in this second exemplary embodiment. Liquid crystals in odd zones 201 (depicted as white) have a first alignment direction while liquid crystals in even zones 202 (depicted as gray) have a second alignment direction. Specifically, in FIG. 3B, the liquid crystals in odd zones 201 are oriented at an angle (approximately 45 degrees) relative to the liquid crystals in even zones 202, while all liquid crystals are parallel to the surface of the FLC cell. The alignment directions are shown by the dark gray rods 200, and the liquid crystals in each of the odd zones 201 have the same alignment and the liquid crystals in each of the even zones 202 have the same alignment.

In this second exemplary embodiment, the LC Fresnel lens provided a diffraction efficiency of about 18% in the FOCUS state and about 50% transmittance in the DEFOCUS state.

Both exemplary embodiments discussed above utilize an FLC Fresnel lens cell with a chiral liquid crystal layer that corresponds to a ferroelectric liquid crystal of chiral smectic C* phase whose helical structure has a pitch $P_0$ smaller than a gap d between the first and the second substrates of the cell. For the FLC layer thickness d greater than helical pitch $P_0$, the applied voltage V is greater than the critical voltage for the helix unwinding (hereinafter abbreviated $V_c$) i.e. $V>V_c$ and for the optimal anchoring energy of the alignment layer ESH electro-optical mode exists.

Figure 4:
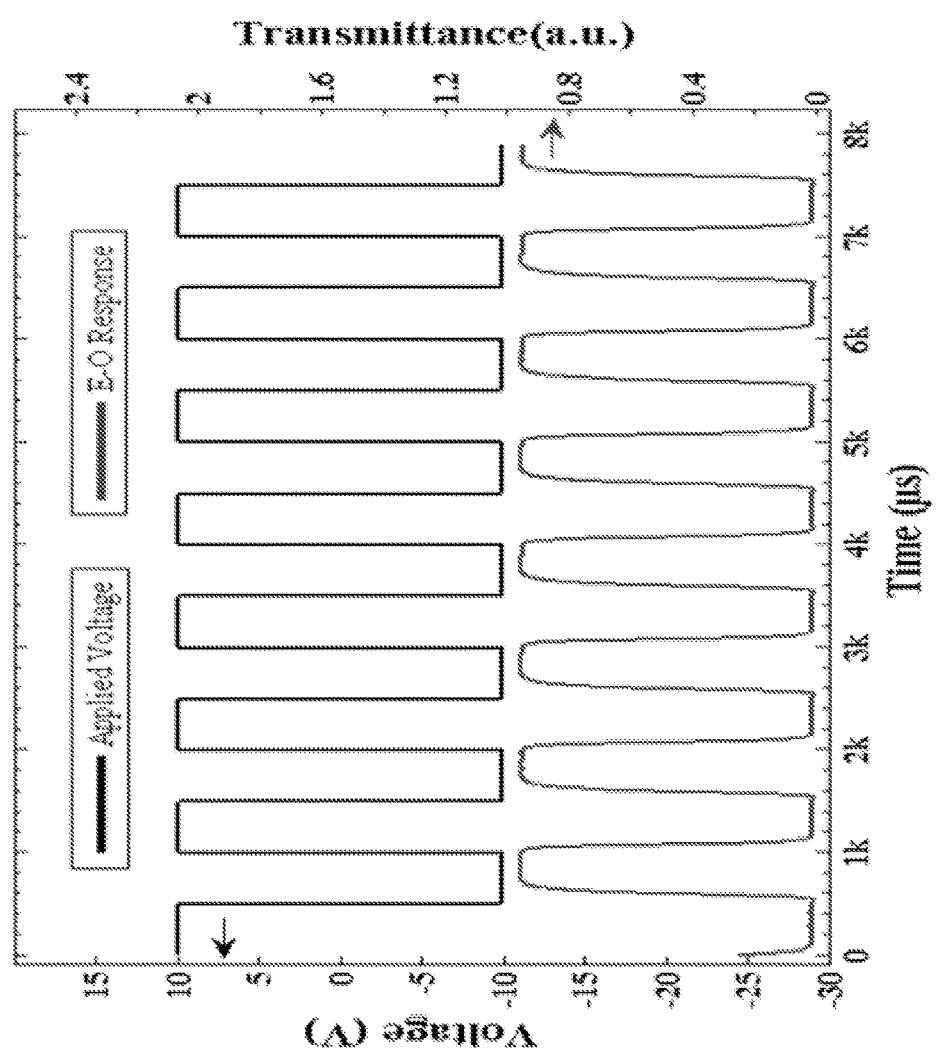
FIG. 4 illustrates an applied voltage waveform and a corresponding transmittance graph for an LC Fresnel lens having FOCUS and DEFOCUS states according to an exemplary embodiment of the invention.

The ESH electro-optical mode manifests very small electro-optical response time and high frequency electro-optical modulation. For example, as depicted in the graph of FIG. 4, the FLC Fresnel lens manifests electro-optical modulation with the applied voltage frequency of 1 kHz at the electric field of 6.5 volts/μm. The electro-optical response of the FLC cell (bottom of FIG. 4) is shown relative to the applied voltage (top of FIG. 4) at temperature (T)=22° C., wavelength (λ)=0.63 μm and the operational frequency (f) of 1 kHz.

Figure 5:
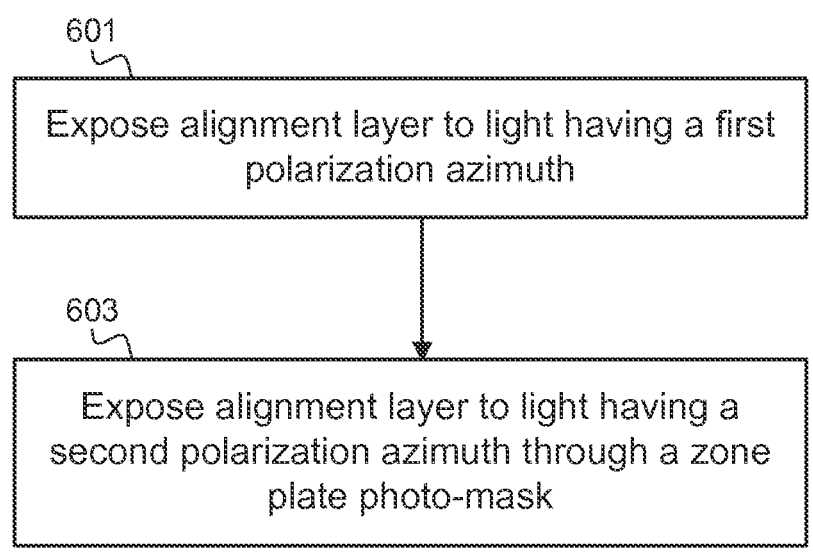
FIG. 5 illustrates a two-step process for photoalignment according to embodiments of the invention.

FIG. 5 illustrates a flowchart for a two-step photo exposure alignment process by which an alignment layer, such as an optically-active sulfonic azo dye SD1 layer coated on a transparent conducting layer on the inner surface of the transparent substrate of an FLC cell, may be patterned with alignment domains satisfying the conditions for Fresnel zones. The alignment domains cause the principal (or "easy") optical axes of the ferroelectric liquid crystals of the FLC layer of the FLC cell to be deployed, in one alignment domain, at an angle relative to an adjacent alignment domain (e.g., 90 degrees in the FOCUS/OFF embodiment, 45 degrees in the FOCUS/DEFOCUS embodiment, or at some other angle). It will be appreciated that in other embodiments, the alignment layer may also be a polyimide layer or an alignment layer produced by oblique evaporation.

In a first step of the alignment process at stage 601 (before the FLC cell is assembled), alignment is made in one direction (e.g., by photoalignment or rubbing in one direction, based on the type of alignment material used). Then, in a second step of the alignment process at stage 603 (either before or after the cell is assembled), the cell is exposed again through a Fresnel zone plate photo-mask. In an exemplary embodiment, the second exposure at stage 603 utilizes UV light having an orthogonal polarization azimuth relative to the polarization azimuth of UV light used for the first exposure at stage 601 (e.g., for the FOCUS/OFF embodiment).

Through this two-step process, two types of alignment domains are generated on the aligning surface(s) of the cell (e.g., alignment layer 300 depicted in FIG. 3). In the case where the cell utilizes two aligning surfaces, the two types of alignment domains are generated without any mutual shifting (i.e., there is no mismatch between the alignment on the top alignment surface relative to the alignment on the bottom alignment surface). Thus, according to embodiments of the invention, a simple and precise fabrication process is provided where, unlike conventional fabrication processes, fine-grained adjustment of the alignment surfaces is not required for the alignment domains of the cell to be positioned properly.

It will be appreciated that the angle between two alignment domains (e.g., 90 degrees for the FOCUS/OFF embodiment and 45 degrees for the FOCUS/DEFOCUS embodiment) could be changed to any value higher than the tilt angle of the ferroelectric liquid crystal, and that for different kinds of ferroelectric liquid crystals, which have different tilt angles, the angles used for various embodiments may be different.

Moreover, the ferroelectric liquid crystal may utilize a pre-tilt angle on the surface, which helps to suppress the effect of having chevron defects in the FLC layer. The amount of the pre-tilt angle may be controlled via photoalignment, which allows embodiments of the invention to achieve higher optical quality relative to conventional fabrication methods.

Figure 6:
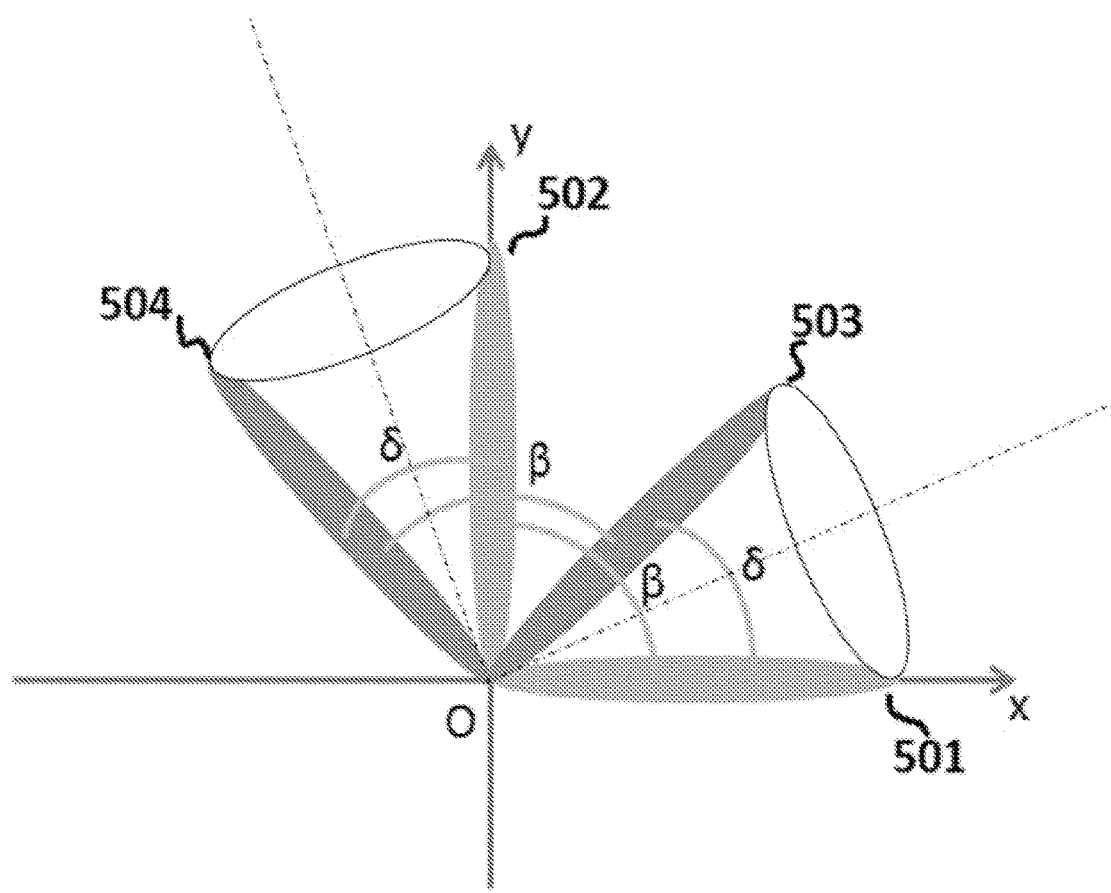
FIG. 6 illustrates liquid crystal orientations according to embodiments of the invention.

FIG. 6 is a diagram depicting liquid crystal orientations in two states and two domains (State 1 Domain 1 (501), State 1 Domain 2 (502), State 2 Domain 1 (503), State 2 Domain 2 (504)) in the xy-plane depicted in FIG. 1, corresponding to the FOCUS/OFF embodiment discussed above. State 1 represents the FLC cell under a positive voltage, State 2 represents the FLC under a negative voltage, Domain 1 corresponds to odd zone domains (e.g., element 201 in FIG. 2), and Domain 2 corresponds to even zone domains (e.g., element 202 in FIG. 2). The switching angle between the ferroelectric liquid crystal orientations in two states is δ (switching occurs when the AC waveform having positive and negative voltage portions is applied). The angle between the liquid crystal orientation in two domains is β.

In an example, the liquid crystals of the FLC layer have a switching angle δ of 43°. For such an FLC layer, the angle β would be 90° for an LC Fresnel lens switchable between the FOCUS and OFF states, and the angle β would be 45° an LC Fresnel lens switchable between the FOCUS and DEFOCUS states.

The relative angle between the domains of the FLC cell β (as depicted in FIG. 6), may be adjusted to achieve different performance. Changing this angle β causes changes in the contrast ratio between the FOCUS state and the other state of the FLC cell. For example, for β=90° as shown in FIG. 6, the FLC cell is able to achieve an OFF state, but for β=45° in other embodiments, the FLC cell is able to achieve a DEFOCUS state.

For an LC Fresnel lens switchable between the FOCUS and OFF states, the FLC cell is placed between two crossed polarizers such that the polarizer plane is parallel to a switching plane of any one of the alignment domains (the switching positions of the FLC in the alignment domains is in the switching plane), and the adjacent alignment domains are offset by an angle relative to each other (e.g., 90 degrees). AC rectangular voltage pulses are applied to the FLC cell to switch the ferroelectric liquid crystal molecules from one position to other and vice versa. The angle between the two positions is δ (i.e., cone angle) as shown in FIG. 6, which is 43° for a particular FLC. The FLC helix axis in two domains have been aligned mutually orthogonal to each other (β=90°).

For an LC Fresnel lens switchable between the FOCUS and DEFOCUS states, the FLC cell is also placed between two crossed polarizers such that the polarizer plane is parallel to a switching plane of any one of the alignment domains (the switching positions of the FLC in the alignment domains is in the switching plane), and the FLC cell has adjacent alignment domains offset by an angle relative to each other (e.g., 45 degrees). To achieve relatively high diffraction efficiency and high transmittance, the angle should be optimized according to an optimization function which takes into account the diffraction efficiency of the output light in the FOCUS state and the transmittance of the output light in the DEFOCUS state. In an example, adjacent domains of the FLC layer of the FLC cell are aligned at a 45° angle relative to each other (i.e., the optimal angle for β would be 45°).

An exemplary optimization function for an LC Fresnel lens switchable between the FOCUS and DEFOCUS states is as follows:

$$\vec{E}_{in} = E_0 \begin{bmatrix} 1 \\ 0 \end{bmatrix}.$$

$$\vec{E}_{out} = E_0 \cos(2\gamma - \alpha) \begin{bmatrix} \cos\alpha \\ \sin\alpha \end{bmatrix}.$$

$$E_{1,1} = \cos(2\gamma - \alpha)$$

$$E_{2,1} = \cos[2(\gamma + 43°) - \alpha]$$

$$E_{1,2} = \cos[2(\gamma + \beta) - \alpha]$$

$$E_{2,2} = \cos[2(\gamma + \beta + 43°) - \alpha]$$

where $E_{i,j}$ represents E in state i and domain j, α is the angle between analyzer and polarizer (e.g., 132°), β is the angle between two domains (e.g., 45°), and γ is the angle of state 1/domain 1 relative to an x-axis (e.g., 0°).

An exemplary optimization function for an LC Fresnel lens switchable between the FOCUS and OFF states is as follows:

$$\vec{E}_{in} = E_0 \begin{bmatrix} 1 \\ 0 \end{bmatrix}.$$

$$\vec{E}_{out} = E_0 \cos(2\gamma - \alpha) \begin{bmatrix} \cos\alpha \\ \sin\alpha \end{bmatrix}.$$

$$E_{1,1} = \cos(2\gamma - \alpha)$$

$$E_{1,2} = \cos[2(\gamma + \beta) - \alpha]$$

$$E_{2,1} = \cos[2(\gamma + 43°) - \alpha]$$

$$E_{2,2} = \cos[2(\gamma + \beta + 43°) - \alpha]$$

where $E_{i,j}$ represents E in state i and domain j, α is the angle between analyzer and polarizer (e.g., 90°), β is the angle between two domains (e.g., 90°), and γ is the angle of state 1/domain 1 relative to an x-axis (e.g., 0°).

Figure 7A:
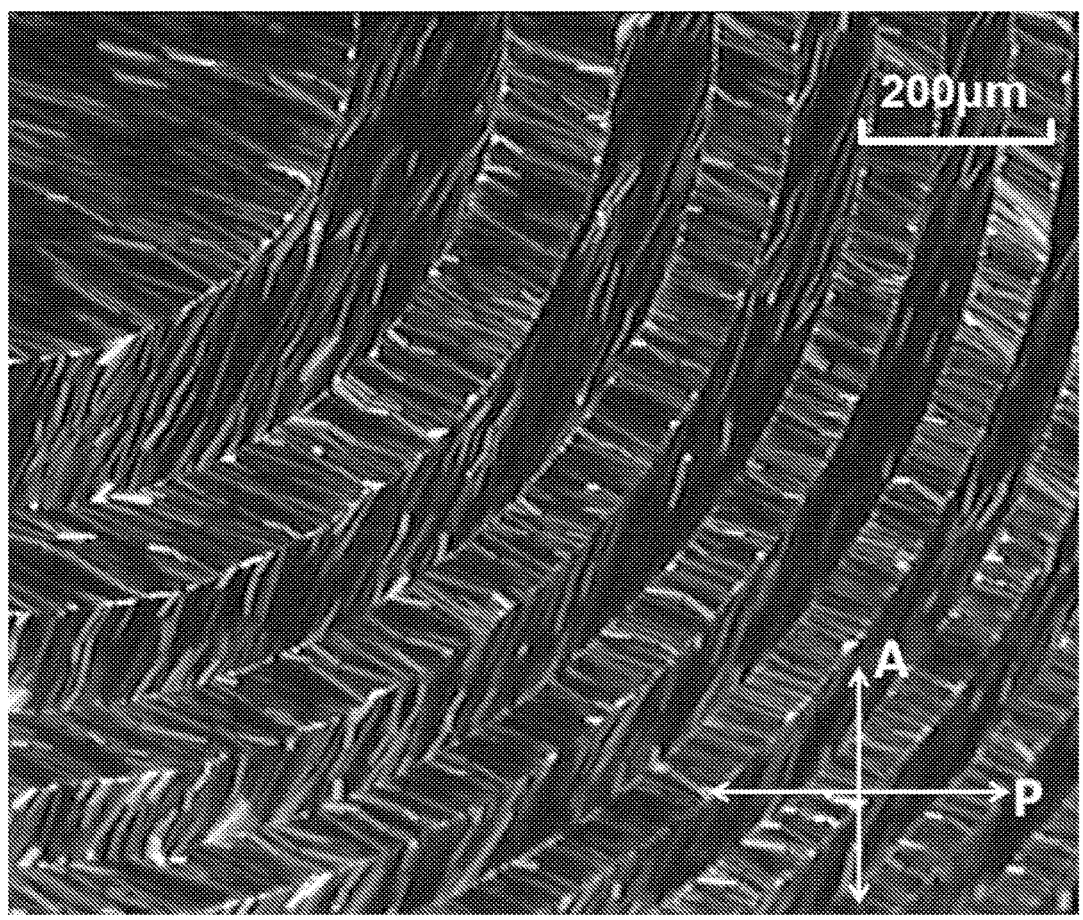
FIGS. 7A-7B are optical microphotographs illustrating an FLC cell according to an exemplary embodiment of the invention.
Figure 7B:
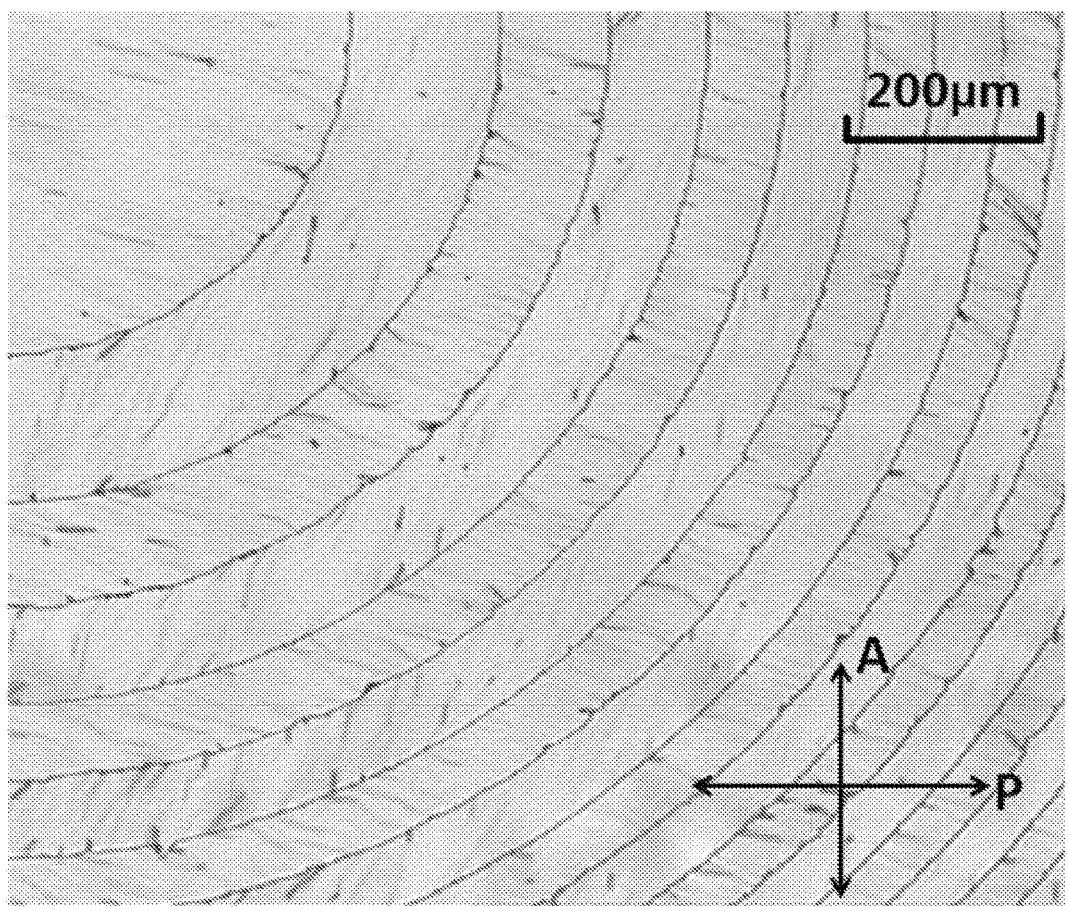

FIGS. 7A-7B are optical microphotographs of an exemplary embodiment of an FLC cell of an LC Fresnel lens switchable between FOCUS and OFF states, with the LC Fresnel lens having crossed polarizers. The FLC cell has alignment domains with two different directions, with adjacent domains being offset by an angle of 90 degrees. The radius of the innermost circle of the alignment pattern is approximately 360 μm. FIG. 7A depicts the FLC cell in a first switching state (i.e., the OFF state). FIG. 7B depicts the FLC cell in a second switching state (i.e., the FOCUS state).

Figure 8A:
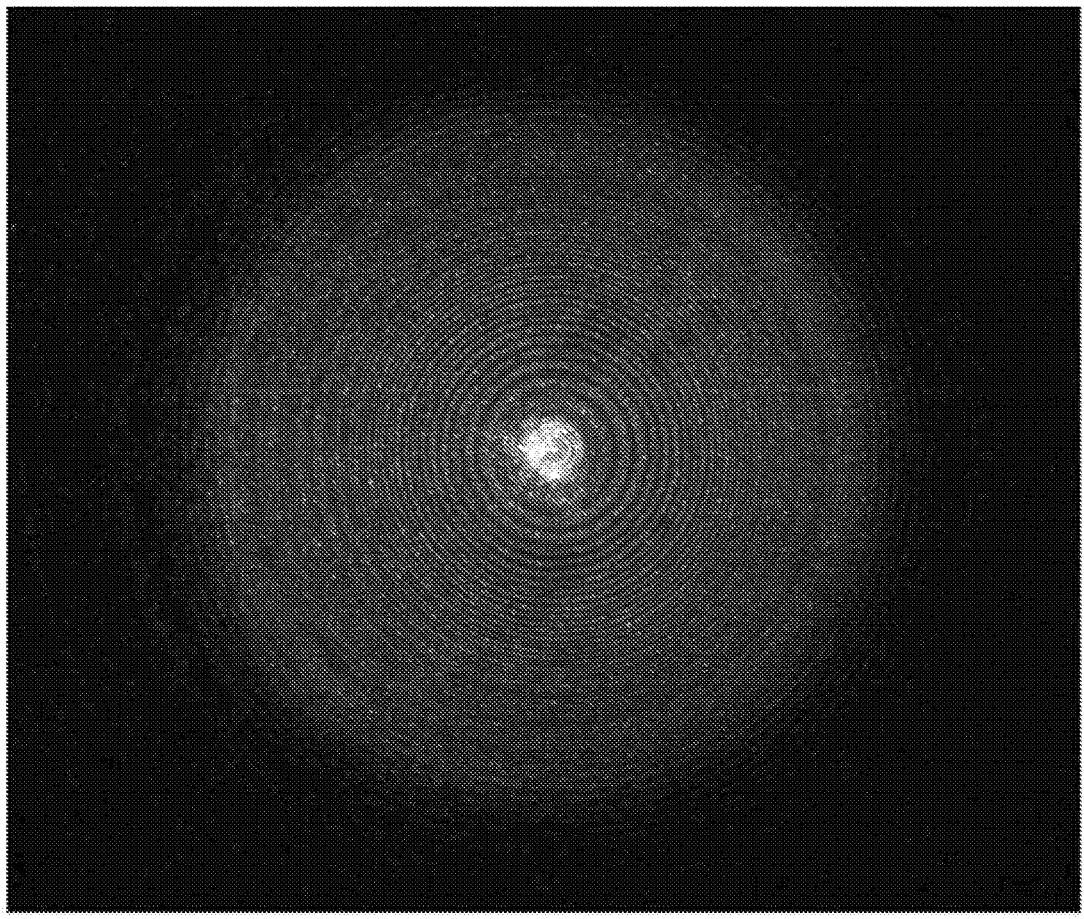
FIGS. 8A-8B are images illustrating images of diffraction patterns corresponding to an FLC cell according to an exemplary embodiment of the invention.
Figure 8B:
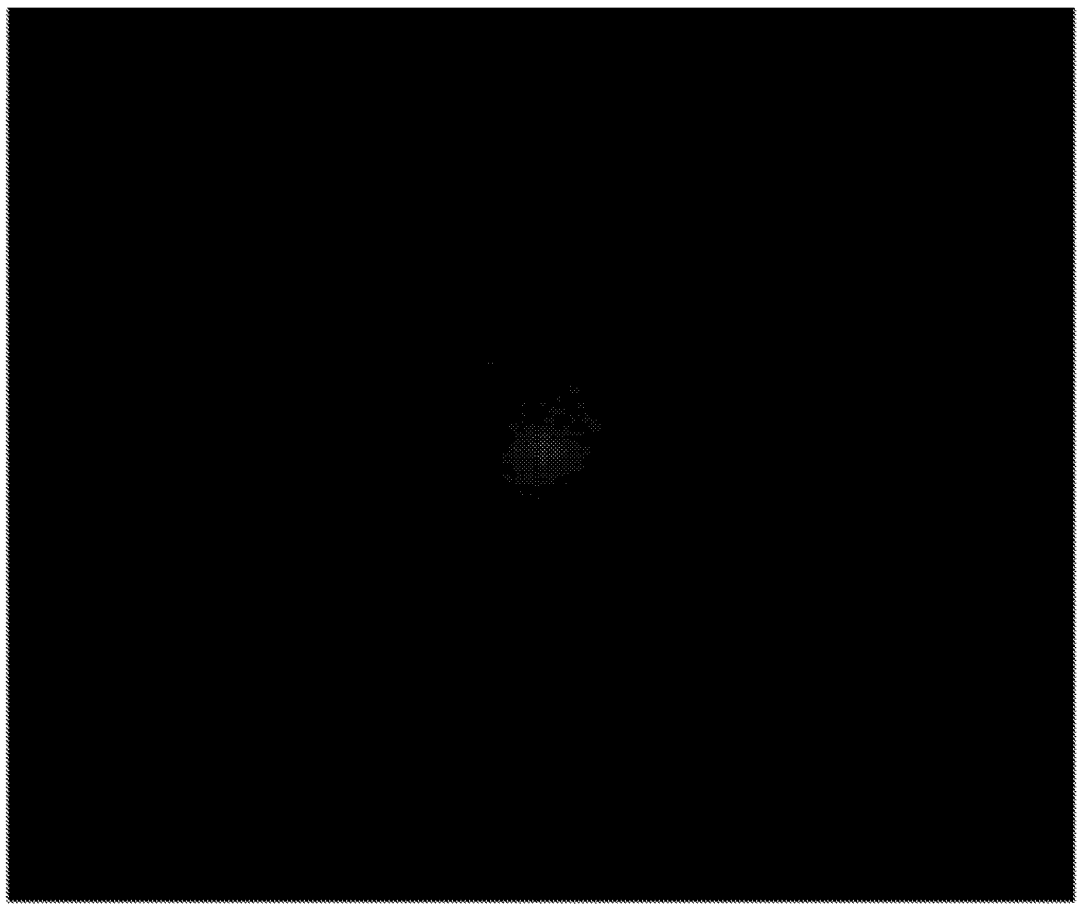

FIGS. 8A-8B are black and white versions of images illustrating the diffraction patterns that are produced by light passing through the exemplary embodiment of the LC Fresnel lens discussed above with respect to FIGS. 7A-7B. As a result of the polarizers, the applied voltage pulses, and the configuration of the FLC cell, diffraction patterns appear in the FOCUS state (as shown in FIG. 8A), while little or no diffraction appears in the OFF (or "dark") state (as shown in FIG. 8B). In an example, the diffraction efficiency in the FOCUS state was more than 37%.

In this exemplary embodiment corresponding to the FOCUS/OFF embodiment, the optical axis of the polarizer is set along the x-axis (with reference to FIG. 1), while the optical axis of the analyzer (i.e., a crossed polarizer) is set along y-axis (with reference to FIG. 1).

Figure 9A:
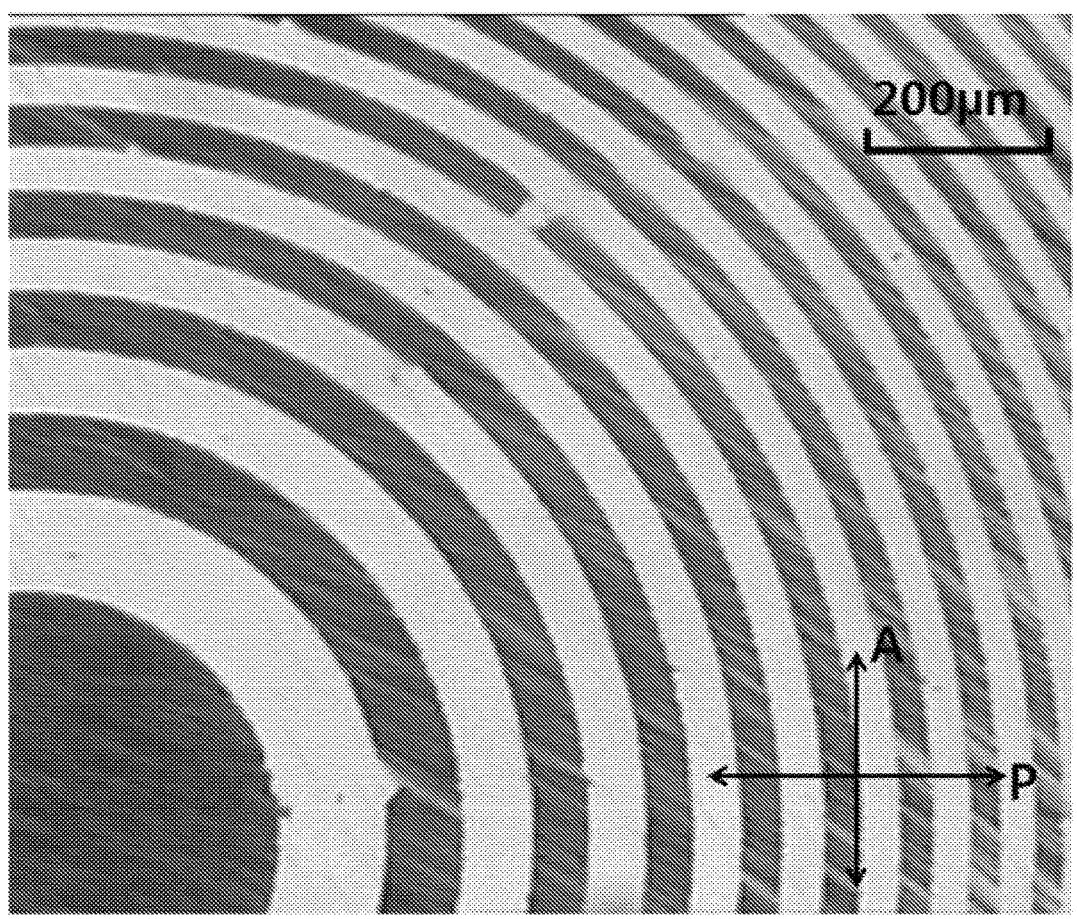
FIGS. 9A-9B are optical microphotographs illustrating an FLC cell according to an exemplary embodiment of the invention.
Figure 9B:
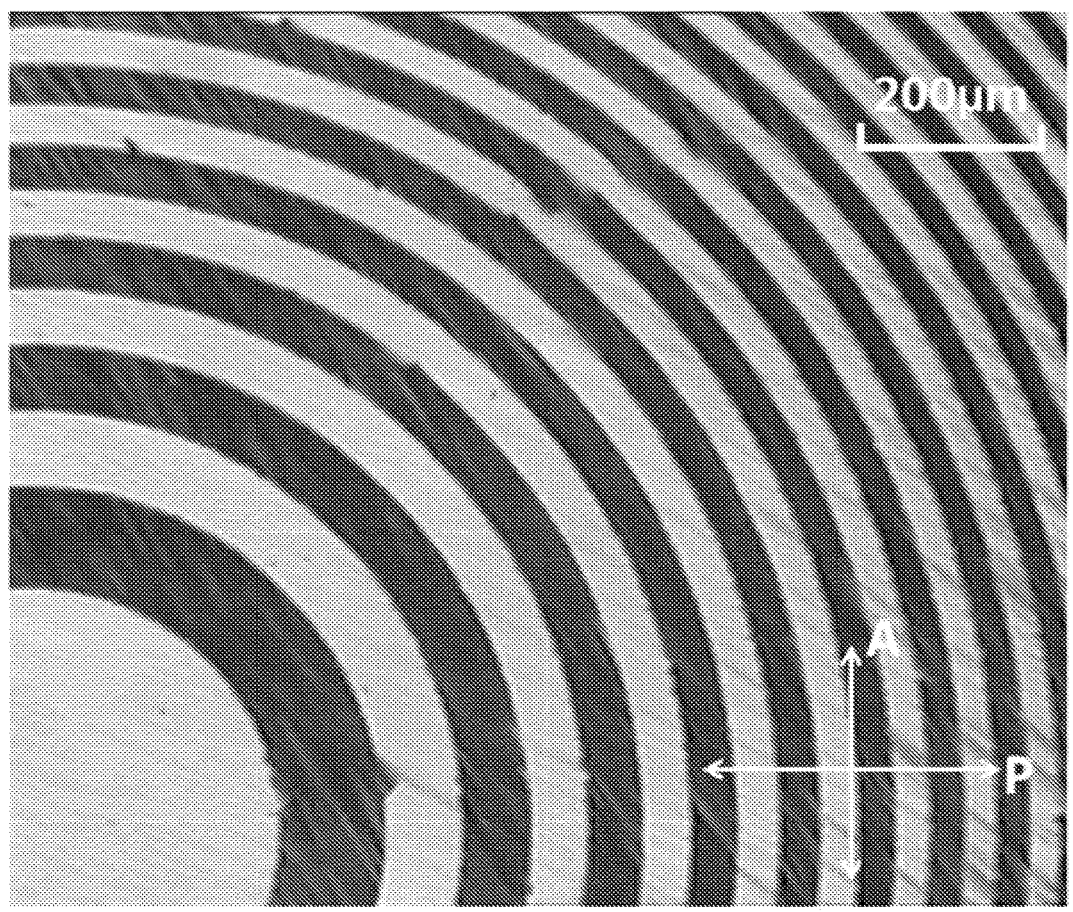

FIGS. 9A-9B are optical microphotographs of an exemplary embodiment of an FLC cell of an LC Fresnel lens switchable between FOCUS and DEFOCUS states, with the LC Fresnel lens having crossed polarizers. The FLC cell has alignment domains with two different directions, with adjacent domains being offset by an angle of 45 degrees. The radius of the innermost circle of the alignment pattern is approximately 255 μm. FIG. 9A depicts the FLC cell in a first switching state (i.e., the DEFOCUS state). FIG. 9B illustrates the FLC cell in a second switching state (i.e., the FOCUS state).

In this exemplary embodiment corresponding to the FOCUS/DEFOCUS embodiment (involving an FLC with cone angle of 43°), the optical axis of the polarizer is set along the x-axis (with reference to FIG. 1), while the optical axis of the analyzer (i.e., a crossed polarizer) is set at an angle of 132° relative to the x-axis (with reference to FIG. 1).

Figure 10A:
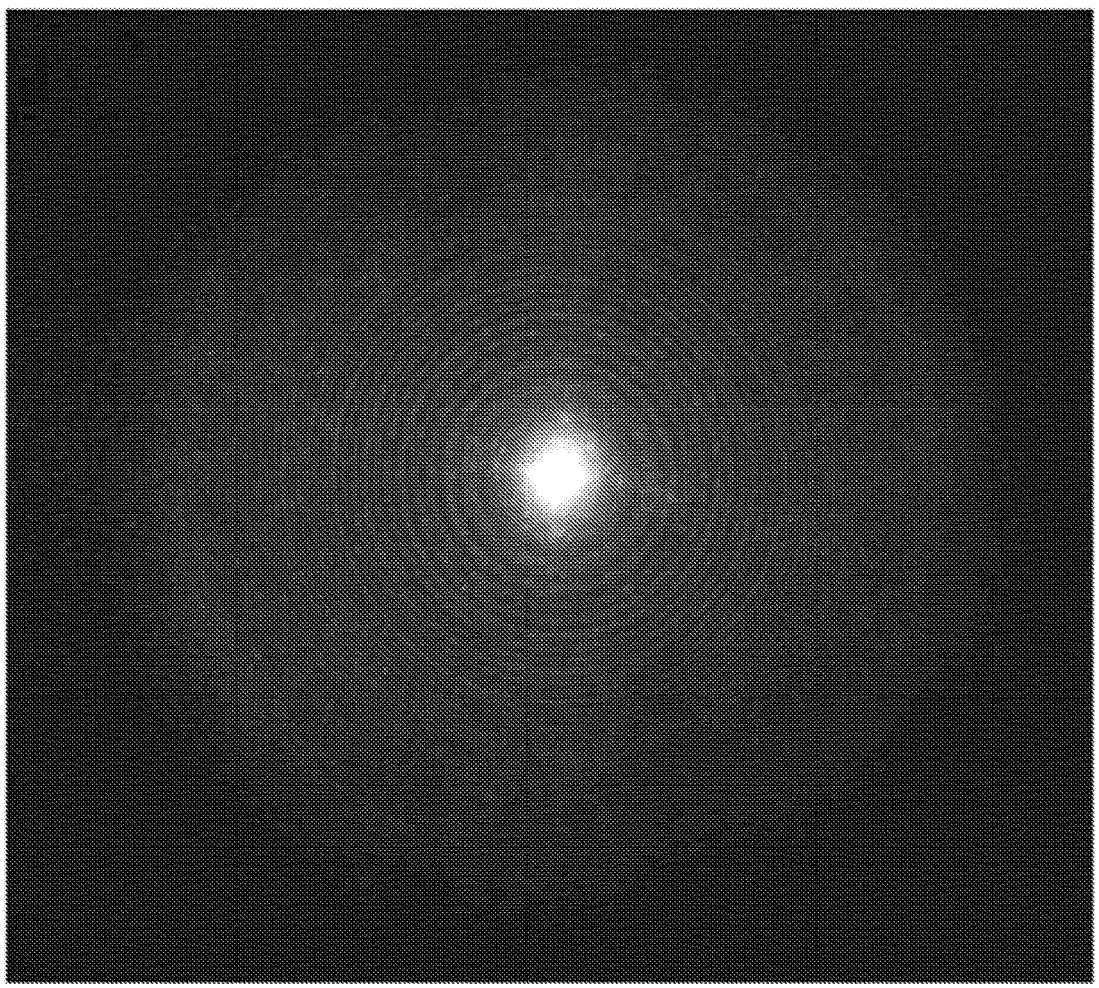
FIGS. 10A-10B are images illustrating diffraction patterns corresponding to an FLC cell according to an exemplary embodiment of the invention.
Figure 10B:
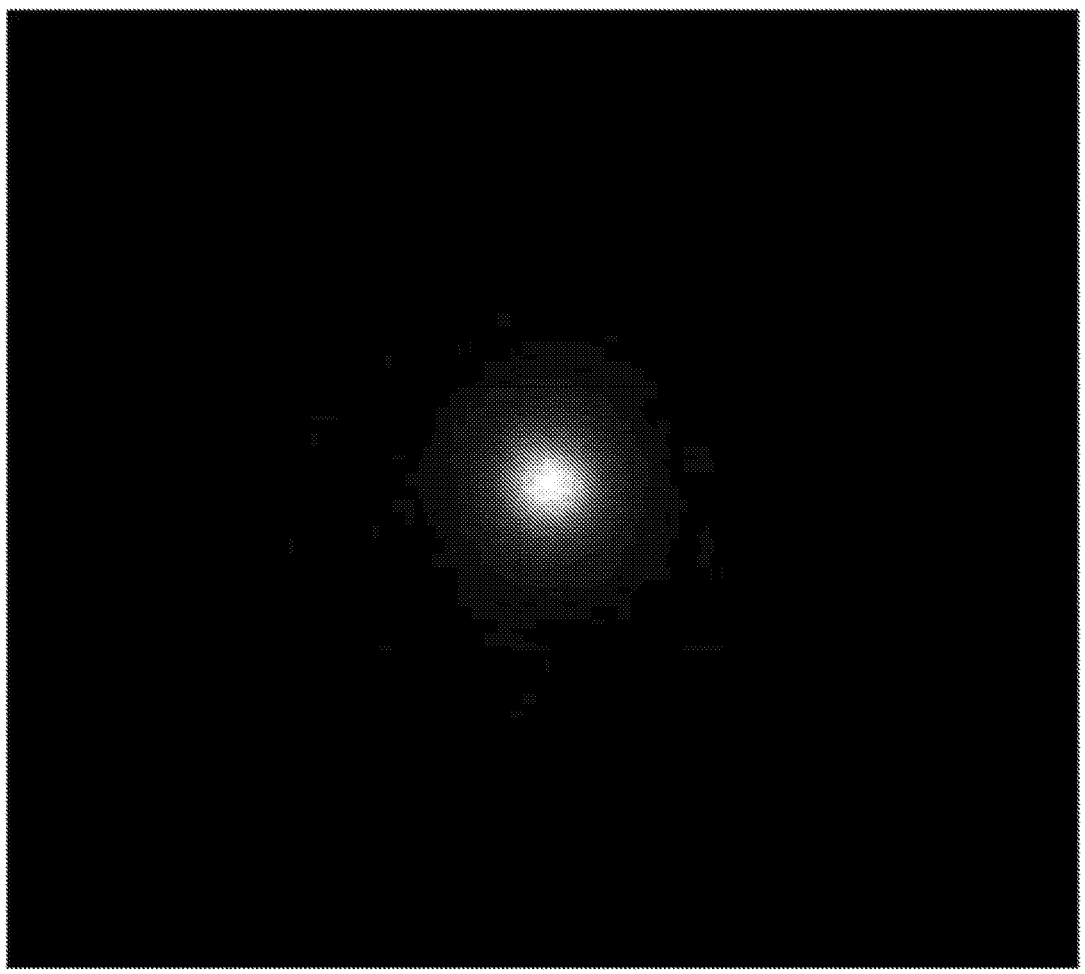

FIGS. 10A-10B are black and white versions of images illustrating the diffraction patterns that are produced by light passing through the exemplary embodiment of the LC Fresnel lens discussed above with respect to FIGS. 9A-9B. As a result of the polarizers, the applied voltage pulses, and the configuration of the FLC cell, diffraction patterns appear in the FOCUS state (as shown in FIG. 10A), while little or no diffraction appears in the DEFOCUS state (as shown in FIG. 10B). In an example, the diffraction efficiency in the FOCUS state was about 15% and the transmittance of the transmission state was about 46%.

It will be appreciated that while the embodiments of the invention discussed herein utilize ferroelectric liquid crystals and ESH mode, embodiments of the invention may also be implemented using deformed ferroelectric liquid crystals such that the ferroelectric crystal layer is in a deformed helix ferroelectric (DHF) liquid crystal mode. In DHF liquid crystal mode, the optical axis of the FLC cone of orientations can be changed continuously within the FLC cone, while in the ESH mode discussed above, the optical axis of the FLC cone of orientations can only be switched between two states. One way of thinking of the differences between DHF mode and ESH mode is that ESH mode provides a binary system while DHF mode provides a continuous (or "analog") system.

Embodiments of the invention may also include a ferroelectric liquid crystal layer in a surface-stabilized ferroelectric liquid crystal (SSFLC) mode. The operation of an FLC cell in SSFLC mode is similar to ESH mode as discussed above, except that in SSFLC mode the FLC helical axis is suppressed by the action of the surface of the cell while in ESH such suppression does not occur.

It will further be appreciated that the Fresnel lenses discussed herein may be of the transmission or reflective type.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid crystal Fresnel lens, comprising:
    a liquid crystal cell, comprising:
        two transparent substrates having conducting layers and at least one photoalignment layer disposed thereon, wherein the at least one photoalignment layer includes multiple alignment domains in a Fresnel zones pattern, and wherein easy axes of adjacent alignment domains of the Fresnel zones pattern are oriented at an angle relative to one another;
        a ferroelectric liquid crystal layer disposed between the two transparent substrates, wherein the ferroelectric liquid crystal layer has a planar surface orientation and smectic layers perpendicular to the two transparent substrates, and
        wherein the ferroelectric liquid crystal layer comprises electrically-suppressed helix ferroelectric liquid crystals with helix pitch smaller than the thickness of the ferroelectric crystal layer; and
    a voltage source, configured to apply an AC rectangular voltage to the conducting layers with amplitude higher than the critical voltage amplitude for helix unwinding of the electrically-suppressed helix ferroelectric liquid crystals so as to facilitate switching the liquid crystal cell between different states; and
    two polarizers, wherein the liquid crystal cell is disposed between the two polarizers; and
    wherein zone boundaries of the Fresnel zones pattern are approximately defined by circles having radii according to the formula $$r_n = \sqrt{n\lambda f + \frac{n^2\lambda^2}{4}}$$

where n is an integer, $\lambda$ is a wavelength of light, and f is a focal length of the liquid crystal Fresnel lens.

2. The liquid crystal Fresnel lens according to claim 1, wherein the lens is configured to be operated in a FOCUS state and a DEFOCUS state, wherein the FOCUS state is a diffractive state configured to produce a diffraction pattern and the DEFOCUS state is a transmission state configured to allow light to pass through without producing a diffraction pattern.

3. The liquid crystal Fresnel lens according to claim 1, wherein the lens is configured to be operated in a FOCUS state and an OFF state, wherein the FOCUS state is a diffractive state configured to produce a diffraction pattern and the OFF state is a dark state configured to prevent light from passing through the lens.

4. The liquid crystal Fresnel lens according to claim 1, wherein the liquid crystal cell is configured to achieve saturated electro-optical modulation for frequencies greater than or equal to approximately 10 kHz.

5. The liquid crystal Fresnel lens according to claim 1, wherein the two substrates are made of plastic.

6. The liquid crystal Fresnel lens according to claim 1, wherein at least one of the two substrates is reflective and the lens is a reflective lens.

7. The liquid crystal Fresnel lens according to claim 1, wherein the relative angle corresponding to adjacent alignment domains is greater than a tilt angle of the ferroelectric liquid crystals of the ferroelectric liquid crystal layer.

8. The liquid crystal Fresnel lens according to claim 1, wherein the at least one photoalignment layer includes non-zero pre-tilt angles.

* * * * *